Figure 1:
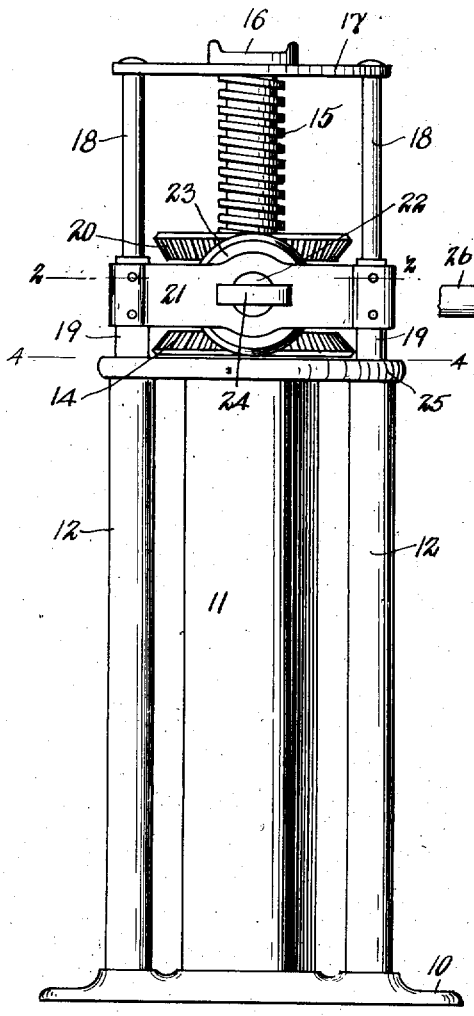

May 22, 1923.

Re. 15,609

E. E. THOMSON

JACK

Original Filed Dec. 1, 1919 2 Sheets Sheet 1

INVENTOR.

Enos E. Thomson,

BY

Fay, Oberlin & Fay

ATTORNEYS

May 22, 1923. Re. 15,609

E. E. THOMSON

JACK

Original Filed Dec. 1, 1919 2 Sheets-Sheet 2

INVENTOR.
Enos E. Thomson
BY
Guy, Oberlin & Day
ATTORNEYS

Reissued May 22, 1923. Re. 15,609

UNITED STATES PATENT OFFICE.

ENOS E. THOMSON, OF CLEVELAND, OHIO.

JACK.

Original No. 1,359,849, dated November 23, 1920, Serial No. 341,773, filed December 1, 1919. Application for reissue filed July 15, 1921. Serial No. 485,042.

*To all whom it may concern:*

Be it known that I, ENOS E. THOMSON, a citizen of the United States, and a resident of Cleveland, county of Cuyahoga, and State of Ohio, have invented a new and useful Improvement in Jacks, of which the following is a specification, the principle of the invention being herein explained and the best mode in which I have contemplated applying that principle, so as to distinguish it from other inventions.

This invention relates to jacks, and comprehends a construction, by means of which a load may be lifted twice as high and twice as fast as with an ordinary jack, and with the expenditure of a minimum of energy.

The nature and advantages of the invention will be better understood when the following detail description is taken in connection with the accompanying drawings, the invention residing in the construction, combination and arrangement of parts as claimed.

In the drawings forming part of this specification, like numerals of reference indicate similar parts in the several views and wherein:—

Figure 5:
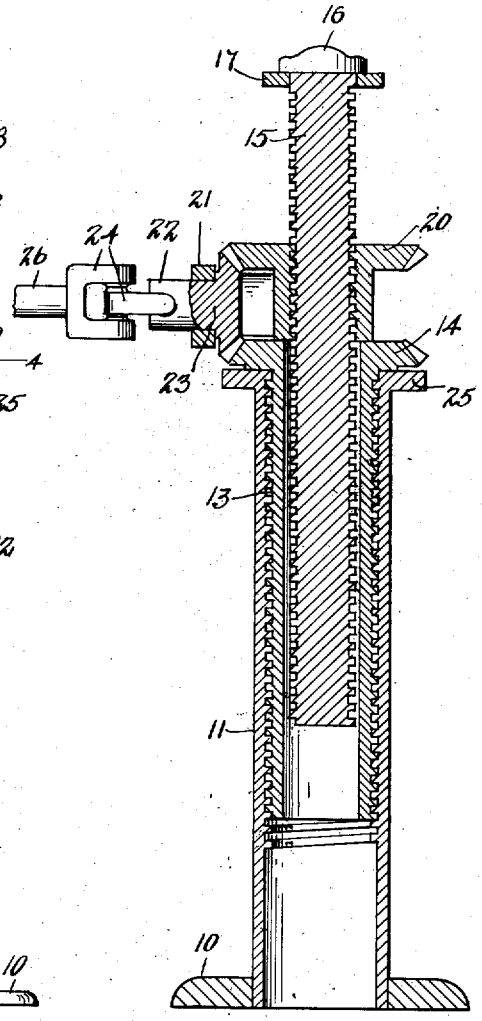
Figure 2:
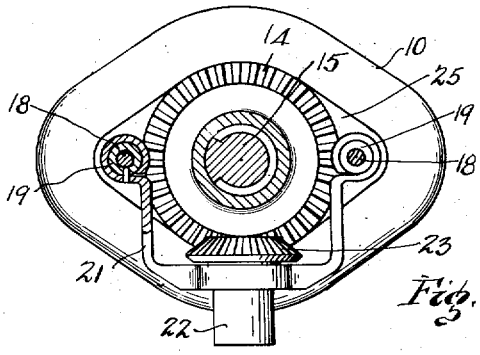
Figure 3:
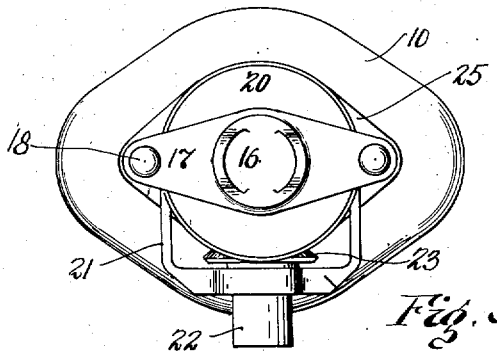
Figure 4:
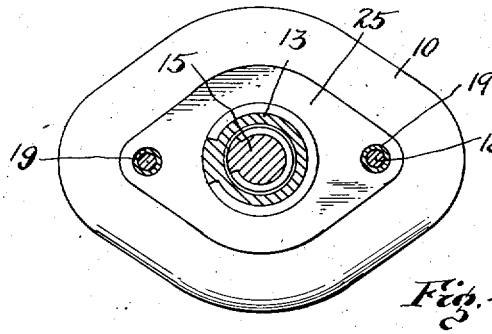

Figure 1 is a side elevation of the jack constructed in accordance with my invention; Figure 2 is a transverse sectional view taken on the line 2—2 of Figure 1; Figure 3 is a top plan view; Figure 4 is a transverse sectional view taken on the line 4—4 of Figure 1; Figure 5 is a vertical sectional view taken through the jack.

The jack constructed in accordance with my invention comprises a base 10, from which rises a plurality of hollow tubular standards. These standards include a central standard 11 whose diameter greatly exceeds the diameter of the standards 12. The standard 11 is interiorly threaded to accommodate an exteriorly threaded sleeve 13 which is provided with a bevel gear 14 at the upper end thereof. The lifting screw 15 is slidable through the sleeve and has a relatively large end portion 16. This screw is supported by means of the transverse member 17 of a frame which includes parallel depending rods 18 which are telescopically fitted within the tubular members 19, which latter are slidably fitted within the tubular members 12. A bevel gear 20 oppositely disposed with regard to the bevel gear 14 is threadedly associated with the screw 15 for the purpose to be hereinafter described.

A plate of substantially U-shaped formation in plan is indicated at 21 and is terminally connected with the tubular members 19. This plate constitutes a bearing for the shaft 22 upon which is fixed the pinion or bevel gear 23 which is positioned between the gears 14 and 20 respectively to operate these gears. The shaft 22 is of the extension crank type embodying universal joints 24 so that the user of the jack may stand in an upright position while raising or lowering the jack as the occasion may require. The tubular standards 11 and 12 respectively are connected at their upper ends by means of the plate 25 which serves to brace the construction, and also serves as a seat for the bevel gear 14 of the hollow sleeve 13. In practice, the crank extension 26 of the shaft 22 is actuated to operate the gear 23, which in turn operates the gears 14 and 20 in reverse directions. The gear 14 rotates the sleeve 13 within the tubular standard 11 thereby elevating the sleeve, while the gear 20 slides the screw 15 upwardly through the sleeve 13 approximately twice as fast as the speed with which the sleeve 13 is elevated. It is therefore obvious that the jack will elevate a load twice the distance and twice as fast as the jack of ordinary construction and that the construction and arrangement is such that all ratchets and catches are eliminated. When the jack is not in use, the crank extension can be folded against the jack so as to provide an article which can be conveniently carried in a tool box or the like. The tubular members 19 and the rods 18 telescope one within the other, while the members 19 telescope within the standards 12 when the jack is being raised or lowered as will be understood.

While it is believed that from the foregoing description that the nature and advantages of the invention will be readily apparent, I desire to have it understood that I do not limit myself in this connection, in that such changes may be resorted to when desired as fall within the scope of what is claimed.

Having thus described my invention what I claim as new is:—

1. A jack comprising a base, a hollow tubular standard rising therefrom, and interiorly threaded, an exteriorly threaded sleeve operable within said standard, a bevel gear secured to the upper end of said sleeve, a lifting screw slidable through said sleeve, a bevel gear having threaded association with said screw, means for rotating said gears in reverse direction whereby the sleeve is elevated within the standard and the screw lifted with respect to said sleeve, and means for supporting said screw.

2. A jack comprising a base, a hollow tubular standard rising therefrom and interiorly threaded, spaced hollow standards rising from said base, an exteriorly threaded sleeve operable within said threaded standard, and a bevel gear carried by the upper end of said sleeve, a lifting screw slidable through said sleeve, a bevel gear threadedly associated within said screw, a frame supporting said screw, and including parallel members slidably fitted within said spaced tubular standards, and means for rotating said gears in a reverse direction whereby the sleeve is rotated to elevate the screw with relation to the sleeve.

3. A jack comprising a base, an enlarged tubular standard rising therefrom and interiorly threaded, spaced hollow tubular standards rising from the base at opposite sides of the enlarged standard, a sleeve exteriorly threaded and operable within the enlarged standards, and a bevel gear carried by the upper end of said sleeve, a bevel gear having threaded association with said lifting screw, hollow tubular members telescopically fitted within the standards at the opposite sides of the enlarged standard, a plate connecting said tubular member, said plate constituting a bearing, a shaft journaled in said bearing, a bevel gear carried by the shaft and arranged to operate the aforementioned gears in reverse direction, whereby the sleeve is elevated within the tubular member upon rotation, and the lifting screw elevated with respect to the sleeve, a frame supporting said screw, and said frame including parallel rods telescopically fitted within said tubular member.

4. In a device of the character described, the combination of two screw members, one interiorly and the other exteriorly threaded; an object-engaging terminal upon each of said members; two relatively rotatable members having threaded engagement with said screw-members, respectively; and means adapted simultaneously to turn said rotatable members in opposite direction, whereby the distance between sa d object-engaging terminals will be changed.

5. In a device of the character described, the combination of a base provided with an interiorly threaded screw-member; an exteriorly threaded screw-member adapted to engage the object to be lifted; two relatively rotatable members having threaded engagement with said screw-members, respectively; and means adapted simultaneously to turn said rotatable members in opposite directions, whereby said object-engaging member will be moved relatively to said base.

6. In a device of the character described, the combination of two screw-members, one interiorly and the other exteriorly threaded; an object-engaging terminal upon each of said members; two relatively rotatable members having threaded engagement with said screw-members, respectively; gears fixed on said rotatable members, respectively; and means adapted simultaneously to drive said gears in opposite directions, whereby the distance between said object-engaging terminals will be changed.

7. In a device of the character described, the combination of two screw-members, one interiorly and the other exteriorly threaded; an object-engaging terminal upon each of said members; two relatively rotatable members having threaded engagement with said screw-members, respectively; gears fixed on said rotatable members, respectively; a frame reciprocally movable relatively to said interiorly threaded screw-member; and means carried by said frame adapted simultaneously to drive said gears in opposite directions, whereby the distance between said object-engaging terminals will be changed.

8. In a device of the character described, the combination of two screw-members, one interiorly and the other exteriorly threaded; an object-engaging terminal upon each of said members; two relatively rotatable members having threaded engagement with said screw members, respectively; gears fixed on said rotatable members, respectively; a frame reciprocably but non-rotatably movable relatively to said interiorly threaded screw-member; and means carried by said frame adapted simultaneously to drive said gears in opposite directions, whereby the distance between said object-engaging terminals will be changed.

9. In a device of the character described, the combination of two screw-members, one interiorly, and the other exteriorly threaded; an object-engaging terminal upon each of said members; two relatively rotatable members having threaded engagement with said screw-members, respectively, the rotatable member that engages said exteriorly threaded screw-member being rotatably supported on the other rotatable member; a frame reciprocably but non-rotatably movable relatively to said interiorly threaded screw-member; and means carried by said frame adapted simultaneously to drive said gears in opposite directions, whereby the distance between said object-engaging terminals will be changed.

Signed by me, this 8th day of July, 1921.

ENOS E. THOMSON.